(12) United States Patent
Tan et al.

(10) Patent No.: US 12,266,474 B2
(45) Date of Patent: Apr. 1, 2025

(54) CAPACITOR STRUCTURE AND POWER CONVERTER

(71) Applicant: Sungrow Power Supply Co., Ltd., Hefei (CN)

(72) Inventors: Jun Tan, Hefei (CN); Qiyao Zhu, Hefei (CN); Hao Zheng, Hefei (CN); Xianwei Zhang, Hefei (CN); Jin Zhang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 435 days.

(21) Appl. No.: 17/592,556

(22) Filed: Feb. 4, 2022

(65) Prior Publication Data

US 2022/0375686 A1    Nov. 24, 2022

(30) Foreign Application Priority Data

May 21, 2021  (CN) .......................... 202121110162.2

(51) Int. Cl.
*H01G 2/10* (2006.01)
*H01G 4/228* (2006.01)
(Continued)

(52) U.S. Cl.
CPC ............. *H01G 2/10* (2013.01); *H01G 4/228* (2013.01); *H01G 4/385* (2013.01); *H02M 3/155* (2013.01); *H02M 5/293* (2013.01); *H02M 7/537* (2013.01)

(58) Field of Classification Search
None
See application file for complete search history.

(56) References Cited

U.S. PATENT DOCUMENTS 4,677,523 A * 6/1987 Kauppi ................. H01G 4/38
                                                    361/329
9,596,782 B2   3/2017 Nishikimi et al.
(Continued)

FOREIGN PATENT DOCUMENTS

EP      2 876 702 A1    5/2015
JP      2006324337 A  * 11/2006
(Continued)

OTHER PUBLICATIONS

Extended European Search Report for European Application No. 22154540.3, dated Aug. 9, 2022.

*Primary Examiner* — Eric W Thomas
(74) *Attorney, Agent, or Firm* — Wolf, Greenfield & Sacks, P.C.

(57) ABSTRACT

A capacitor structure and a power converter are provided. The capacitor structure includes a parallel cell combination, and the parallel cell combination includes a plurality of cells and a plurality of current collectors. In the parallel cell combination: the cells are connected in parallel, and the poles connected in parallel are respectively connected with other devices through corresponding confluence points. Same poles of two adjacent cells are connected through a corresponding current collector, and the current-carrying specifications of each current collector is lower than the current-carrying requirements of a confluence point of a corresponding pole. That is to say, a conductor that implements the parallel connection of the cells is no longer a whole copper plate, but the individual current collectors, thus realizing the reduction of the cost of the conductor material.

17 Claims, 5 Drawing Sheets

(51) Int. Cl.
*H01G 4/38* (2006.01)
*H02M 3/155* (2006.01)
*H02M 5/293* (2006.01)
*H02M 7/537* (2006.01)

(56) References Cited

U.S. PATENT DOCUMENTS

2012/0270075 A1   10/2012   Fujimura
2017/0365421 A1*  12/2017   Horikawa ............... H01G 11/74
2022/0130622 A1*  4/2022    Bartley .................. H01G 11/82

FOREIGN PATENT DOCUMENTS

JP       2007-165698 A     6/2007
WO    WO 2019/150596 A1    8/2019

* cited by examiner

CAPACITOR STRUCTURE AND POWER CONVERTER

The present application claims priority to Chinese Patent Application No. 202121110162.2, titled "CAPACITOR STRUCTURE AND POWER CONVERTER", filed on May 21, 2021 with the China National Intellectual Property Administration, which is incorporated herein by reference in its entirety.

FIELD

The present disclosure relates to the technical field of power electronics, and in particular, to a capacitor structure and a power converter.

BACKGROUND

With an increase of power of an inverter system, a demand for capacity of a single capacitor is also increasing. In this case, it is necessary to integrate a plurality of capacitors together. However, a bus structure integrating the plurality of capacitors is relatively complicated, the processing is difficult, and the cost is relatively high.

Figure 1:
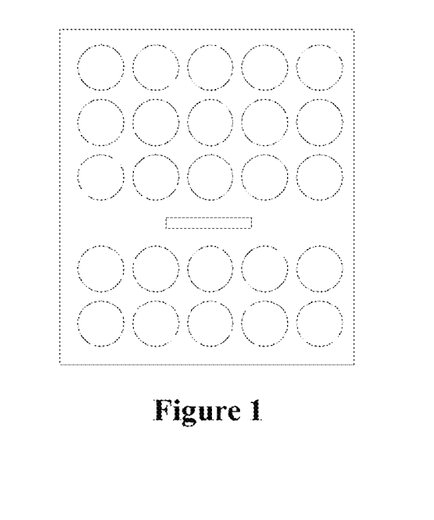
FIG. 1 is a main view of a capacitor pool structure according to the conventional technology.
Figure 2:
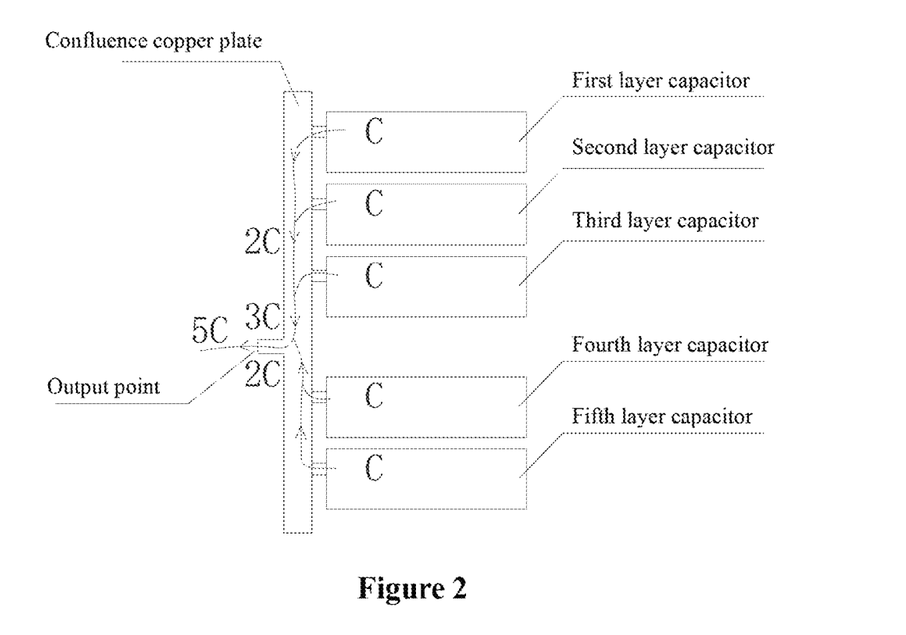
FIG. 2 is a left view of a capacitor pool structure according to the conventional technology.

Referring to FIG. 1, in conventional technology, a plurality of capacitors are arranged in a capacitor pool in turn, and a confluence copper plate is laid on connection ends of the plurality of capacitors to complete a connection between same poles of the capacitor pool. Since the whole piece of the confluence copper plate needs to converge same poles of all capacitors, a current-carrying capacity of the confluence copper plate must meet the requirements of a maximum output current of the capacitor pool. Taking a capacitor structure shown in FIG. 2 as an example, the capacitor structure includes five layers of capacitors, and an output point is located between a third layer and a fourth layer. According to the structural scheme shown in FIG. 2, the confluence copper plate needs to meet the current-carrying requirements of at least 3 C, while the overcurrent of a first layer capacitor, a second layer capacitor, a fourth layer capacitor and a fifth layer capacitor only needs to reach 1 C or 2 C.

In other words, a current-carrying area at a confluence copper plate corresponding to a capacitor far from the output point has greatly met the current-carrying requirements of the overcurrent of the capacitor at the corresponding position. Therefore, it can be considered to reduce the current-carrying area at the corresponding position, and then reduce the raw materials to reduce the cost. However, because the confluence copper plate is a whole copper plate, that is, a structural member, it is not easy to realize a whole plate with different current-carrying areas in practical application, which leads to a large part of the waste of the confluence copper plate.

SUMMARY

In view of the above, a capacitor structure and a power converter are provided in the present disclosure to reduce cost.

In order to achieve the above objectives, technical solutions provided by the present disclosure are as follows.

In a first aspect of the present disclosure, a capacitor structure is provided. The capacitor structure includes a parallel cell combination, and the parallel cell combination includes a plurality of cells and a plurality of current collectors;

in the parallel cell combination:
the plurality of cells are connected in parallel, each of the plurality of cells includes a first pole and a second pole, first poles and second poles of the plurality of cells are respectively connected in parallel, and the first poles connected in parallel and the second poles connected in parallel are respectively connected with other devices other than the parallel cell combination through corresponding confluence points; and
same poles of each two adjacent cells of the plurality of cells are connected through a corresponding current collector, and current-carrying specifications of each of the plurality of current collectors is lower than current-carrying requirements of a confluence point of a corresponding pole.

In an embodiment of the present disclosure, current-carrying specifications of a collector are reduced with an increase of a distance between said collector from a confluence point of a corresponding pole, and an current-carrying area of said collector decreases with the increase of the distance between said collector from the confluence point of the corresponding pole.

In an embodiment of the present disclosure, two confluence points are arranged on a same outermost layer of the parallel cell combination respectively; and
along a direction from each of the two confluence points to a corresponding pole in the other outermost layer of the parallel cell combination, current-carrying specifications of a collector are reduced, and an current-carrying area of said collector decreases.

In an embodiment of the present disclosure, two confluence points are arranged in middle positions of the parallel cell combination respectively; and
along directions from the middle positions to corresponding poles in two outermost layers of the parallel cell combination respectively, current-carrying specifications of a collector are reduced, and an current-carrying area of said collector decreases.

In an embodiment of the present disclosure, the capacitor structure further includes at least one set of confluence device, and the at least one set of confluence device is configured to implement a connection between the confluence points and a corresponding external device.

In an embodiment of the present disclosure, the confluence points are respectively connected to a positive pole and a negative pole of a first external device through one set of confluence device, and the confluence points are respectively connected to a positive pole and a negative pole of a second external device through another set of confluence device.

In an embodiment of the present disclosure, the capacitor structure further includes another n parallel cell combinations;
all of the parallel cell combinations are connected in series through the corresponding confluence points;
a head end and a tail end of the parallel cell combinations connected in series are respectively connected to a positive pole and a negative pole of a corresponding external device through at least one set of confluence device; and
a connection point of two adjacent parallel cell combinations is connected to an intermediate potential of the corresponding external device through a corresponding confluence device.

In an embodiment of the present disclosure, the head end and the tail end of the parallel cell combinations connected in series are respectively connected to a positive pole and a negative pole of a first external device through one set of confluence device, and the head end and the tail end of the parallel cell combinations connected in series are respectively connected to a positive pole and a negative pole of a second external device through another set of confluence device; and the connection point of two adjacent parallel cell combinations is connected to an intermediate potential of the second external device through the corresponding confluence device.

In an embodiment of the present disclosure, the capacitor structure further includes:

a plurality of individual housings, each individual housing wrapping one of the plurality of cells; or a common housing wrapping the parallel cell combination, at least one set of connection ends connecting the corresponding external device and a corresponding confluence device being provided on the common housing.

In an embodiment of the present disclosure, the capacitor structure further includes:

a plurality of individual housings, each individual housing wrapping one of the plurality of cells; or a common housing wrapping all of the parallel cell combinations, at least one set of connection ends connecting the corresponding external device and the corresponding confluence device being provided on the common housing; or a plurality of combination housings wrapping each of the parallel cell combinations respectively, each of the combination housings being provided with three connection ends, and the three connection ends being connected to corresponding poles or potentials of the corresponding external device and adjacent parallel cell combinations.

In a second aspect of the present disclosure, a power converter is provided. The power converter includes at least one capacitor, and the at least one capacitor is the capacitor structure according to any one of the embodiments of the first aspect of the present disclosure.

In an embodiment of the present disclosure, a main circuit of the power converter is any one of the following: a DC-DC conversion circuit, a DC-AC conversion circuit, and an AC-AC conversion circuit.

In an embodiment of the present disclosure, in a case that either side of the DC-DC conversion circuit is provided with a positive pole, a negative pole and a midpoint, a support capacitor on said side of the DC-DC conversion circuit includes two capacitor structures, and each of the two capacitor structures is the capacitor structure according to any one of the embodiments including one parallel cell combination of the first aspect of the present disclosure; and the two capacitor structures are connected in series between the positive pole and the negative pole of said side of the DC-DC conversion circuit, and a connection point of the two capacitor structures is connected to the midpoint of said side of the DC-DC conversion circuit.

In an embodiment of the present disclosure, in a case that either side of the DC-DC conversion circuit is provided with a positive pole, a negative pole and a midpoint, a support capacitor on said side of the DC-DC conversion circuit includes the capacitor structure according to any one of the embodiments including the plurality of parallel cell combinations of the first aspect of the present disclosure; and the capacitor structure includes two parallel cell combinations.

In an embodiment of the present disclosure, a half-bus capacitor on a DC side of the DC-AC conversion circuit is the capacitor structure according to any one of the embodiments including one parallel cell combination of the first aspect of the present disclosure, two capacitor structures are connected in series between a positive pole and a negative pole of a corresponding side of the DC-AC conversion circuit, and a connection point of the two capacitor structures is connected to a midpoint of the side; or a half-bus capacitor of a DC bus of the AC-AC conversion circuit is the capacitor structure according to any one of the embodiments including one parallel cell combination of the first aspect of the present disclosure, two capacitor structures are connected in series between a positive pole and a negative pole of a corresponding side of the AC-AC conversion circuit, and a connection point of the two capacitor structures is connected to a midpoint of the side.

In an embodiment of the present disclosure, a bus capacitor on a DC side of the DC-AC conversion circuit is the capacitor structure according to any one of the embodiments including the plurality of parallel cell combinations of the first aspect of the present disclosure, and in a case that the number of parallel cell combinations in the capacitor structure is n+1, the DC-AC conversion circuit is a n−2 level topology; or a bus capacitor of a DC bus of the AC-AC conversion circuit is the capacitor structure according to any one of the embodiments including the plurality of parallel cell combinations of the first aspect of the present disclosure, and in a case that the number of parallel cell combinations in the capacitor structure is n+1, the DC-AC conversion circuit is a n−2 level topology.

In an embodiment of the present disclosure, a filter capacitor on an AC side of the DC-AC conversion circuit is the capacitor structure according to any one of the embodiments including one parallel cell combination of the first aspect of the present disclosure; or a bus capacitor on a machine side of the AC-AC conversion circuit and/or a bus capacitor on a network side of the AC-AC conversion circuit is the capacitor structure according to any one of the embodiments including one parallel cell combination of the first aspect of the present disclosure.

A capacitor structure is provided in the present disclosure. The capacitor structure includes a parallel cell combination, and the parallel cell combination includes a plurality of cells and a plurality of current collectors. In the parallel cell combination: the plurality of cells are connected in parallel, each of the plurality of cells includes a first pole and a second pole, first poles and second poles of the plurality of cells are respectively connected in parallel, and the first poles connected in parallel and the second poles connected in parallel are respectively connected with other devices other than the parallel cell combination through corresponding confluence points; same poles of each two adjacent cells of the plurality of cells are connected through a corresponding current collector, and current-carrying specifications of each of the plurality of current collectors is lower than current-carrying requirements of a confluence point of a corresponding pole. That is to say, a conductor that implements the parallel connection of each cell is no longer a whole copper plate in the conventional technology, but the plurality of individual current collectors, and the current-carrying specifications of each current collector is adapted to a current magnitude of its position in the current path, thus realizing the reduction of the cost of the conductor material. In addition, capacity requirements of a high-capacity application scenario can be met due to the parallel connection of each cell in the parallel cell combination.

BRIEF DESCRIPTION OF THE DRAWINGS

In order to more clearly explain the embodiments of the present disclosure or the technical solutions in conventional technology, the drawings used in the description of the embodiments or the conventional technology will be briefly introduced below. Obviously, the drawings in the following description are merely some embodiments of the present disclosure. For those of ordinary skill in the art, other drawings can be obtained according to the provided drawings without paying creative work.

DETAILED DESCRIPTION

The technical solution according to the embodiments of the present disclosure will be described clearly and completely as follows in conjunction with the accompany drawings in the embodiments of the present disclosure. It is obvious that the described embodiments are only a part of the embodiments according to the present disclosure, rather than all of the embodiments. All the other embodiments obtained by those skilled in the art based on the embodiments in the present disclosure without any creative work belong to the scope of protection of the present disclosure.

In the present application, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

In view of a problem of underutilization of the copper plate in the capacitor pool solution in the conventional technology, a capacitor structure is provided in the present disclosure to reduce cost.

Figure 3:
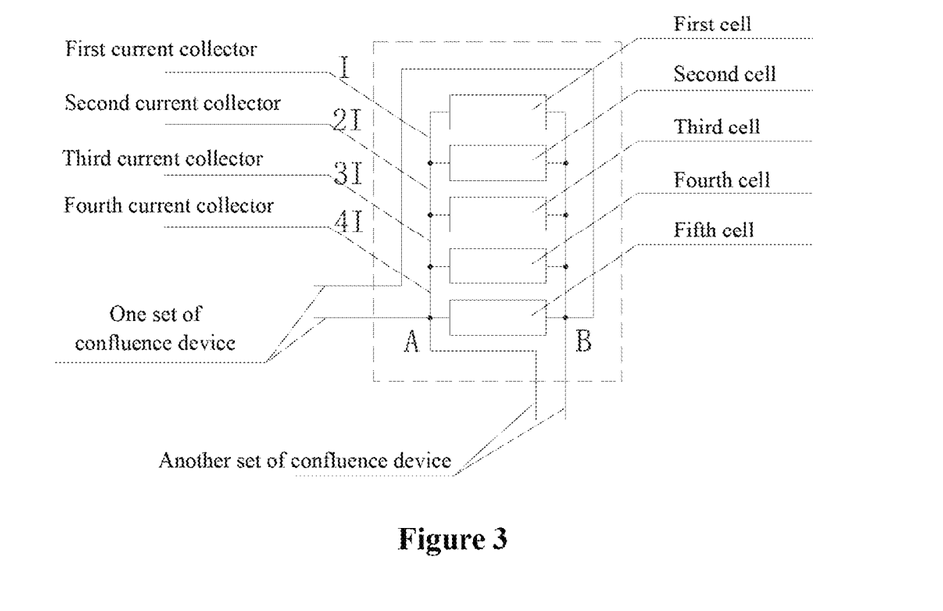
FIG. 3 is a structural schematic view of a capacitor structure provided with only one parallel cell combination according to an embodiment of the present disclosure.
Figure 4:
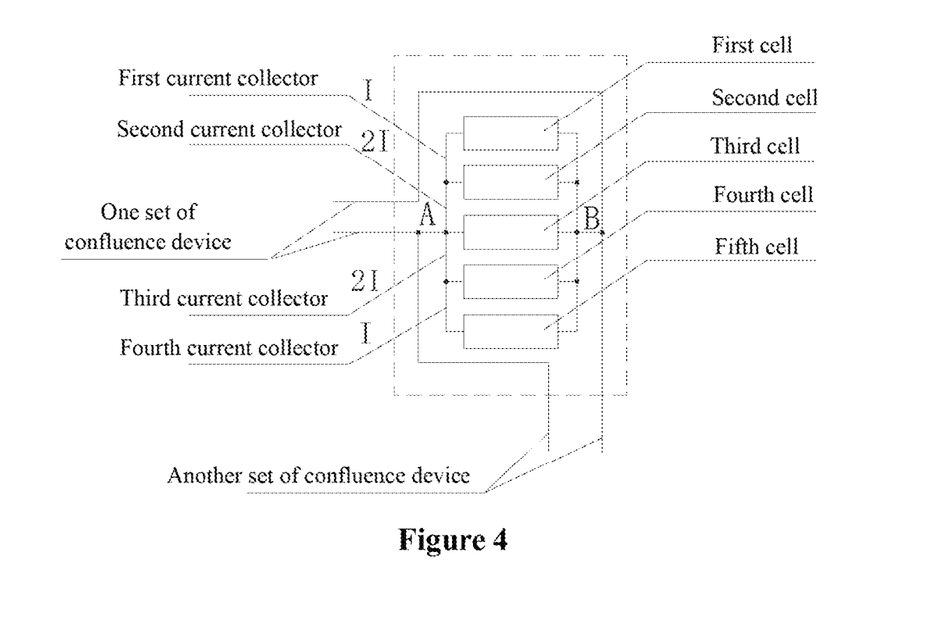
FIG. 4 is a structural schematic view of a capacitor structure provided with only one parallel cell combination according to another embodiment of the present disclosure.

The capacitor structure includes a parallel cell combination, and the parallel cell combination includes multiple cells. Referring to FIGS. 3 and 4, a parallel cell combination including five cells is taken as an example. From top to bottom, the cells are: a first cell, a second cell, a third cell, a fourth cell, and a fifth cell.

As shown in FIGS. 3 and 4, in the parallel cell combination: all cells are connected in parallel to meet a capacity requirement of a single capacitor, and two poles connected in parallel are connected to an external device of the parallel cell combination through corresponding confluence points (such as points A and B shown in FIGS. 3 and 4).

Same poles of two adjacent cells are connected through a corresponding current collector. As shown in FIGS. 3 and 4, the first cell and the second cell are connected through a first current collector. The second cell and the third cell are connected through a second current collector. The third cell and the fourth cell are connected through a third current collector. The fourth cell and the fifth cell are connected through a fourth current collector. In a practical application, when the number of cell layers included in the parallel cell combination is more, the analogy may be applied.

In addition, current-carrying specifications of each current collector is lower than current-carrying requirements of a confluence point of a corresponding pole. For example, the farther away the current collector from the confluence point of the corresponding pole is, the lower the current-carrying specifications and the smaller a carrier area of the current collector. That is, the specifications of the current collector used to implement the connection between the cells can be designed with an appropriate current carrier area based on a path and a magnitude of the current.

As shown in FIGS. 3 and 4, the cells are stacked in layers, and two examples are provided in this embodiment as follows.

(1) The two confluence points are arranged at the same outermost layer of the parallel cell combination respectively. From the confluence points to a corresponding pole in the other outermost layer of the parallel cell combination, the current-carrying specifications of each current collector is gradually reduced and the current-carrying area is gradually reduced.

Five cells integrated in parallel to form the parallel cell combination is taken as an example as follows.

As shown in FIG. 3, two confluence points A and B of the parallel cell combination are arranged at the outermost layer of the parallel cell combination, for example, near the fifth cell.

Since a current flowing through the first current collector is only a current of the first cell, the current-carrying specifications of the first current collector can be designed as current I. By analogy, the second current collector, the third current collector, and the fourth current collector can be designed to currents 2I, 3I and 4I, respectively.

Referring to a left side of FIG. 3, starting at the confluence point A until a left side of the first cell, the current-carrying specifications for current collectors are: 4I, 3I, 2I, I.

Referring to a right side of FIG. 3, starting at the confluence point B until a right side of the first cell, the current-carrying specifications for current collectors are: 4I, 3I, 2I, I.

In this arrangement, the current collectors on both sides of the entire parallel cell combination are in a corresponding unidirectional stepped shape. The farther away the current collector is from the confluence point, the smaller the current-carrying area, which can avoid the waste of remote conductor materials.

It should be noted that, taking the parallel cell combination composed of five cells as an example, the two confluence points can be arranged in a bottom layer as shown in FIG. 3, or in the uppermost layer of the parallel cell combination, that is, the left and right sides of the first cell. Of course, an actual application is not limited to this, here is only an optional implementation.

(2) The two confluence points are arranged in middle positions of the parallel cell combination respectively. From the middle positions to corresponding poles of two outermost layers of the parallel cell combination, the current-carrying specifications of each current collector is gradually reduced and the current-carrying area is gradually reduced.

Five cells integrated in parallel to form the parallel cell combination is taken as an example as well as follows.

As shown in FIG. 4, two confluence points A and B of the parallel cell combination are arranged at the middle positions of the parallel cell combination respectively, for example, near the third cell.

Since the current flowing through the first current collector is only the current of the first cell, a current flowing through the fourth current collector is only a current of the fourth cell, the current-carrying specifications of the first current collector and the fourth current collector both can be designed as current I. While a current flowing through the second current collector is the current of the first cell and the second cell, a current flowing through the third current collector is the current of the third cell and the fourth cell, hence, the current-carrying specifications of the second current collector and the third current collector both can be designed as current 2I.

Taking a left side of FIG. 4 as an example, starting at the confluence point A and up to the first cell, the current-carrying specifications for two current collectors are: 2I, I. Starting at the confluence point A and down to the fifth cell, the current-carrying specifications for two current collectors are also: 2I, I. The solution on a right side of FIG. 4 is the same and is not repeated.

It can be seen, in this arrangement, the current collectors on both sides of the entire parallel cell combination are in a corresponding similar trapezoidal ladder shape. The farther away the current collector is from the confluence point, the smaller the current-carrying area, which can avoid the waste of remote conductor materials.

It should be noted that, the above two examples are not necessary to choose. In practice, the two confluence points can be arranged in any suitable position to adapt to their specific application environment. As long as it can satisfy that the current-carrying area of the current collector decreases with the increase of the distance between the current collector and the confluence point, the waste of the remote conductor material can be avoided and the material cost can be saved. Moreover, in practice, as long as the current-carrying specifications of the current collector connected to the cell can meet the current-carrying requirements of its position, each layer is not limited to one cell, which does not exclude the fact that multiple cells are arranged in the same layer. In fact, as long as the current-carrying requirements of the current collector connected to the cell are lower than the current-carrying requirements of the confluence point of the corresponding pole, material cost can be saved, and it is not limited to the corresponding arrangement according to the distance between the current collector and the confluence point of the corresponding pole. For example, as long as the current-carrying specifications of the current collectors in FIGS. 3 and 4 do not exceed 4I, the current-carrying specifications can be appropriately increased to leave a margin, and all are within the protection scope of the present disclosure.

In the capacitor structure provided in the embodiment, a conductor that implements the parallel connection of each cell is no longer a whole copper plate in the conventional technology, but multiple individual current collectors, and the current-carrying specifications of each current collector is adapted to a current magnitude of its position in the current path. That is, the current collector structure for connecting the cells can be used with a small amount, and thus the cost of the conductor material can be reduced.

In addition, in the capacitor structure provided in the embodiment, the capacity requirements of a high-capacity application scenario can be met due to the parallel connection of each cell in the parallel cell combination. For example, it can simultaneously meet the large-capacity requirements of the inverter for single capacitors and the low-cost requirements of capacitor pool solutions.

On a basis of the above embodiment, a specific embodiment for the connection between two confluence points A and B of the capacitor structure is provided as follows.

Two confluence points, such as points A and B as shown in FIGS. 3 and 4, connect with a positive pole and a negative pole of a first external device through one set of confluence device, and connect with a positive pole and a negative pole of a second external device corresponding to another set of confluence device. When the parallel cell combination includes five cells, the current-carrying specifications of the confluence devices are designed as current 5I.

That is, inside the capacitor structure, two confluence points of the parallel cell combination, namely, the positive pole and the negative pole of the parallel cell combination, are provided with two sets of confluence device. Each set of confluence device includes two confluence devices, to realize confluence between positive poles of the cells and confluence between negative poles of the cells, so that the parallel cell combination can implement the connection with the two external devices. For example, referring to FIG. 9, bus capacitors on a DC side of an inverter (including C1 and C2) need to simultaneously connect with the positive pole and the negative pole of an input power supply (e.g., PV+ and PV− of a photovoltaic string) and the positive pole and the negative pole (DC+ and DC−) on a DC side of a DC-AC conversion circuit. In this case, the connection between the bus capacitors and the input power supply and the DC-AC conversion circuit can be implemented through the corresponding confluence devices, thus avoiding parallel connections of the input power supply and the DC-AC conversion circuit outside the capacitor structure.

In a practical application, it is not excluded that the two confluence devices of the capacitor structure are equipped with only one set of confluence device. In this case, the capacitor structure has only a pair of positive and negative poles that can connect to the external device. If there is more than one external device to connect to, then each external device needs to be connected in parallel outside the capacitor structure.

In addition, the number of the sets of confluence devices is not limited to two sets. In a practical application, it can be more than two sets, that is, the two confluence points can be connected to the corresponding external devices through at least one set of confluence device, which depends on the specific application environment, and are within the scope of protection of the present disclosure.

In addition, the capacitive structure can include a housing to enable the housing to implement fixation and protection of internal components.

The housing of the capacitor structure can be arranged in a variety of situations as follows.

Each cell in the capacitive structure is provided with an individual housing wrapping said cell respectively. In this case, the capacitive structure can be called as a capacitor pool structure.

Or,

All cells inside the capacitive structure are arranged in a common housing, and at least one set of connection ends connecting the corresponding external device and the corresponding confluence device is provided on the common housing. For example, as shown in FIGS. 3 and 4, a first connecting end connects to the first external device and the corresponding confluence device, and a second connection end connects to the second external device and the corresponding confluence device. In this case, the capacitor structure can actually be called a large-capacity single capacitor.

In practice, it is not limited to the above two situations, and any number of internal cells may be shared in the same housing according to the application environment, which are within the scope of protection of the present disclosure.

Figure 5:
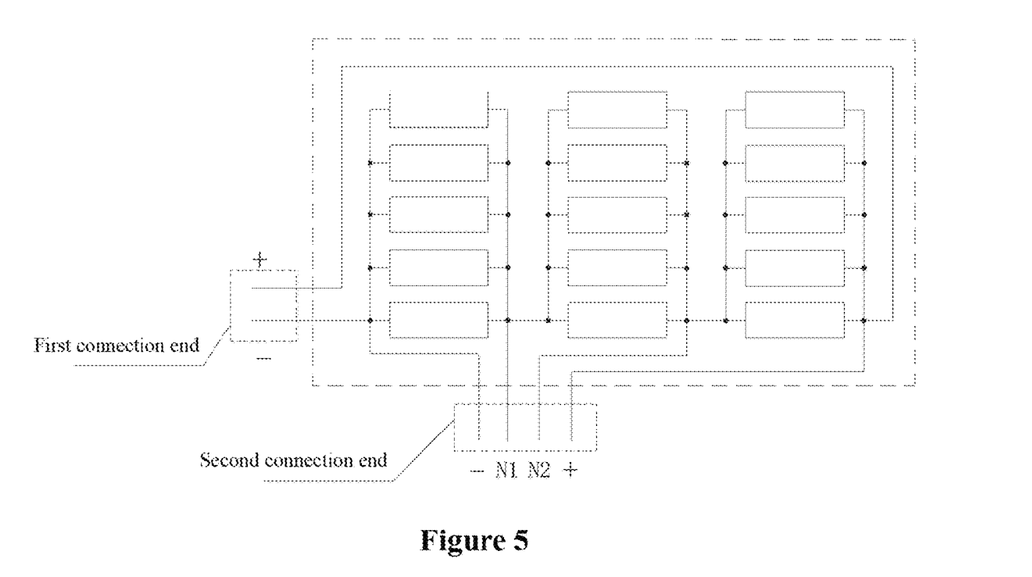
FIG. 5 is a structural schematic view of a capacitor structure provided with a plurality of parallel cell combinations according to an embodiment of the present disclosure.
Figure 6:
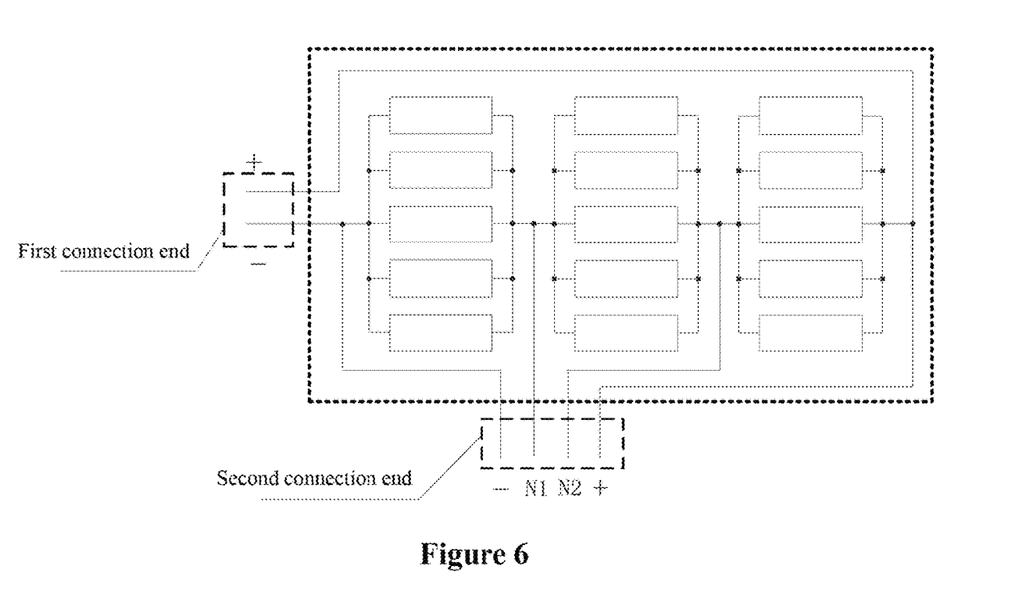
FIG. 6 is a structural schematic view of the capacitor structure provided with the plurality of parallel cell combinations according to another embodiment of the present disclosure.

Another capacitor structure is provided in an embodiment of the present disclosure. As shown in FIGS. 5 and 6, on a basis of the above embodiments, the capacitor structure further includes: additional n parallel cell combinations.

Each parallel cell combination is connected in series through the corresponding confluence points.

A head end and a tail end of a series connection of the parallel cell combinations connect with a positive pole and a negative pole of the corresponding external device through at least one set of confluence device. A connection point of two adjacent parallel cell combinations is connected to an intermediate potential of the external device through a corresponding confluence device.

Referring to FIGS. 5 and 6, the capacitor structure including three parallel cell combinations is taken as an example, and the head end and the tail end of the three parallel cell combinations connected in series are connected to two sets of confluence device respectively. Specifically, the head end and the tail end of the series connection of the parallel cell combinations is configured to connect to the positive pole and the negative pole of the first external device through one set of confluence device, and is configured to connect to the positive pole and the negative pole of the second external device through another set of confluence device. The connection point of the two adjacent parallel cell combinations is connected to an intermediate potential (N1 and N2 as shown in FIGS. 5 and 6) of the second external device through a corresponding confluence device.

In addition, the housing of the capacitor structure including multiple parallel cell combinations can be arranged in a variety of situations as follows.

Each cell inside the capacitor structure is provided with an individual housing wrapping said cell respectively. In this case, the capacitive structure can be called as the capacitor pool structure.

Or,

All cells inside the capacitive structure are arranged in a common housing, and at least one set of connection ends connecting the corresponding external device and the corresponding confluence device is provided on the common housing. For example, as shown in FIGS. 5 and 6, the first connecting end is configured to connect the first external device and the corresponding confluence device, and the second connection end is configured to connect the second external device and the corresponding confluence device. In this case, the capacitor structure can actually be called the large-capacity single capacitor.

Or,

Each of the parallel cell combinations is arranged in a corresponding combination housing respectively. Each combination housing is provided with three connection ends, and the three connection ends are connected to corresponding poles or potentials of the corresponding external device and adjacent parallel cell combinations.

In practice, it is not limited to the above three situations, and any number of internal cells may be shared in the same housing according to their application environment, which are within the scope of protection of the present disclosure.

The capacitor structure described in this embodiment is provided with at least one set of connection ends, which can implement the connection for a variety of external devices. Besides, in addition to the positive and negative poles, at least one set of connection ends is also provided with n intermediate potentials, which can implement the n+2 level under multi-end connection with the corresponding external device, thus meeting requirements of two-level, three-level, four-level or five-level of the inverter system.

In addition, other structures and principles of the capacitor structure provided in the present disclosure are the same as the above embodiments. Therefore, the capacitor structure can also meet requirements of high capacity and voltage resistance level. The current collectors for implementing connection of internal cells are separate conductors, rather than a whole, their specifications are designed according to positions of the confluence points, which can minimize cost of connecting conductors between the capacitor internal cells.

A power converter is further provided in another embodiment of the present disclosure. The power converter includes at least one capacitor, and the at least one capacitor is the capacitor structure according to any one of the above embodiments.

A main circuit of the power converter includes any one of a direct current to direct current (DC-DC) conversion circuit, a direct current to alternating current (DC-AC) conversion circuit, and an alternating current to alternating current (AC-AC) conversion circuit.

Figure 7:
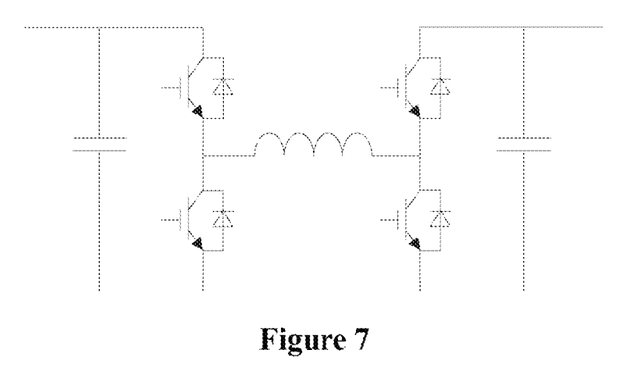
FIG. 7 is a circuit diagram of a DC-DC converter according to an embodiment of the present disclosure.

For the DC-DC conversion circuit with only positive and negative poles on both sides, such as a four-switch two-way lift-down voltage conversion circuit as shown in FIG. 7, a support capacitor on either side of the circuit may be said capacitor structure.

Figure 8:
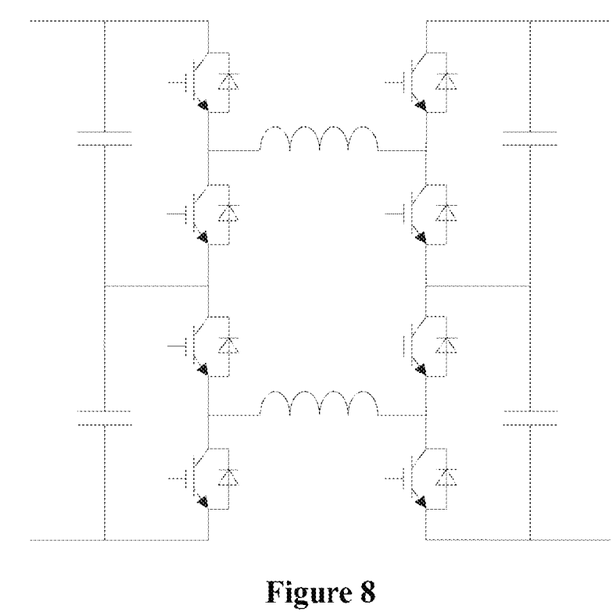
FIG. 8 is a circuit diagram of a DC-DC converter according to another embodiment of the present disclosure.

For the DC-DC conversion circuit including the positive pole and the negative pole, and the midpoint arranged on either side of the DC-DC conversion circuit:

The support capacitor on a corresponding side may include two capacitor structures as shown in FIG. 3 or FIG. 4 and the corresponding embodiments. For example, in a bidirectional high-voltage DC-DC conversion circuit as shown in FIG. 8, the positive pole and the negative pole and the midpoint are provided on both sides, and the support capacitor on both sides may include: two capacitor structures as shown in FIG. 3 or FIG. 4 and the corresponding embodiments. The two capacitor structures are connected in series between the positive and negative poles on the corresponding side, and the connection point of the two capacitor structures are connected to the midpoint on the corresponding side.

The support capacitor on this side may also include: one capacitor structure as shown in FIG. 5 or FIG. 6 and the corresponding embodiments. The capacitor structure includes two parallel cell combinations, and a connection point of the two parallel cell combinations forms the midpoint of the support capacitor.

For specific composition and material settings of the capacitor structure, they can be referred to the above embodiments, which are not repeated here.

Figure 9:
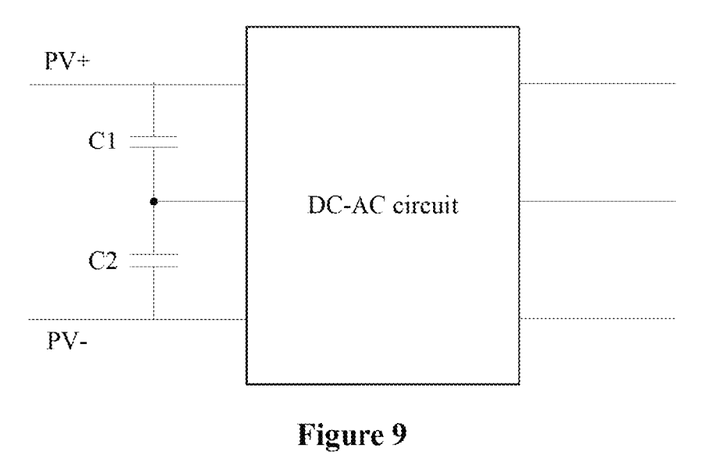
FIG. 9 is a connection schematic view of a bus capacitor on a DC side of an inverter according to an embodiment of the present disclosure.

For the inverter including the DC-AC conversion circuit, referring to FIG. 9, a DC side of the DC-AC conversion circuit is provided with a DC bus capacitor, and an AC side of the DC-AC conversion circuit is provided with a filter capacitor. In a practical application, a left side of the DC bus capacitor can be directly connected to corresponding PV strings (PV+ and PV− as shown in the FIG. 9), or can be connected to the corresponding photovoltaic strings through at least one DC-DC circuit, which is not specifically limited here.

At least one capacitor on the DC and AC sides is the capacitor structure as described in any of the above embodiments. For example:

A half-bus capacitor (such as C1 and C2 in FIG. 9) on the DC side of the DC-AC conversion circuit is the capacitor structure as shown in FIG. 3 or FIG. 4 and the corresponding embodiments. Two capacitor structures are connected in series between the positive and negative poles of the bus side, and a connection point of the two capacitor structures is connected to the midpoint of the bus side.

Or,

A bus capacitor on the DC side of the DC-AC conversion circuit is one capacitor structure as shown in FIG. 5 or FIG. 6 and the corresponding embodiments. When the number of parallel cell combinations in the capacitor structure is n+1, the DC-AC conversion circuit is a n+2 level topology. When n is equal to one, referring to FIG. 9, the positive half-bus capacitor C1 and the negative half-bus capacitor C2 of the DC-AC conversion circuit are one parallel cell combination in the capacitor structure respectively, and the DC-AC conversion circuit is a 3-level topology.

When applied to the inverter, the capacitor structure can also greatly simplify a capacitor pool bus structure of the integrated capacitor to meet a low-cost requirement, in addition to the capacitor structure to meet the high-capacity requirement.

In addition, a filter capacitor on the AC side of the inverter can also be: the capacitor structure as shown in FIG. 3 or FIG. 4 and the corresponding embodiments, and the capacitor structure only needs one set of confluence device in this case.

For specific composition and material settings of the capacitor structure, they can be referred to the above embodiments, which are not repeated here.

In addition, for the AC-AC conversion circuit commonly used in a wind power generation system, each capacitor at a network side, a machine side and a DC bus can also be the capacitor structure described in the above embodiments, the arrangement is similar to the specific settings in the above inverter, which is not repeated here.

The above embodiments in this specification are described in a progressive manner. References may be made among these embodiments with respect to the same or similar portions among these embodiments, each of the embodiments is mainly focused on describing its differences from other embodiments. Especially, for the system or system embodiments, since they are similar to method embodiments, the description thereof is relatively simple, and reference may be made to the description of the method embodiments for relevant parts. The embodiments of the system and the system described above are only schematic. The above unit described as a separate component may be or may be not separate physically. The component displayed as a unit may be or may be not a physical unit, that is, may be located at one place or may be distributed on multiple network units. The object of the solution of each of the embodiments may be achieved by selecting a part or all of the modules according to the practical needs. The present application can be understood and implemented by those skilled in the art without any creative efforts.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A capacitor structure, comprising:
    a parallel cell combination, the parallel cell combination comprising a plurality of cells and a plurality of current collectors;
    wherein in the parallel cell combination:
    the plurality of cells comprising respective first poles and respective second poles are connected in parallel, the first poles and the second poles of the plurality of cells are respectively connected in parallel, and the first poles and the second poles are respectively connected with other devices other than the parallel cell combination through confluence points; and
    the first poles and the second poles of each two adjacent cells of the plurality of cells are respectively connected through the plurality of current collectors, and current-carrying specifications of each of the plurality of current collectors is lower than current-carrying requirements of a respective confluence point of the confluence points of a corresponding pole of the first poles and the second poles.

2. The capacitor structure according to claim 1, wherein current-carrying specifications of a respective current collector of the plurality of current collectors are reduced with an increase of a distance between the respective current collector of the plurality of current collectors from the respective confluence point of the confluence points, and a current-carrying area of the respective current collector of the plurality of current collectors decreases with the increase of the distance between the respective current collector of the plurality of current collectors from the respective confluence point of the confluence points.

3. The capacitor structure according to claim 1, wherein the confluence points comprise two confluence points, and the two confluence points are arranged on a same outermost layer of the parallel cell combination respectively; and
   along a direction from each of the two confluence points in the other outermost layer of the parallel cell combination, the current-carrying specifications of each of the plurality of current collectors are reduced, and the current-carrying area of each of the plurality of current collectors decreases.

4. The capacitor structure according to claim 1, wherein the confluence points comprise two confluence points, and the two confluence points are arranged in middle positions of the parallel cell combination respectively; and
   along directions from the middle positions to the first poles and the second poles in two outermost layers of the parallel cell combination respectively, the current-carrying specifications of each of the plurality of current collectors are reduced, and the current-carrying area of each of the plurality of current collectors decreases.

5. The capacitor structure according to claim 1, wherein the capacitor structure further comprises:
   at least one set of confluence device being configured to implement a connection between the confluence points and the other devices.

6. The capacitor structure according to claim 5, wherein the confluence points are respectively connected to a positive pole and a negative pole of a first external device of the other devices through one set of the confluence device, and the confluence points are respectively connected to a positive pole and a negative pole of a second external device of the other devices through another set of the confluence device.

7. The capacitor structure according to claim 5, wherein the capacitor structure further comprises:
   a plurality of individual housings, each individual housing wrapping one of the plurality of cells; or
   a common housing wrapping the parallel cell combination, at least one set of connection ends connecting the other devices and the confluence device being provided on the common housing.

8. The capacitor structure according to claim 1, wherein the capacitor structure further comprises another n parallel cell combinations, wherein
   all of the parallel cell combinations comprising the parallel cell combination and the another n parallel cell combinations are connected in series through the confluence points;
   a head end and a tail end of all of the parallel cell combinations connected in series are respectively connected to a positive pole and a negative pole of the other devices through at least one set of confluence device; and
   a connection point of two adjacent parallel cell combinations of all of the parallel cell combinations is connected to an intermediate potential of the other devices through the at least one set of confluence device.

9. The capacitor structure according to claim 8, wherein the head end and the tail end of all of the parallel cell combinations connected in series are respectively connected to a positive pole and a negative pole of a first external device of the other devices through one set of the confluence device, and the head end and the tail end of all of the parallel cell combinations connected in series are respectively connected to a positive pole and a negative pole of a second external device of the other devices through another set of the confluence device; and
   the connection point of two adjacent parallel cell combinations is connected to an intermediate potential of the second external device of the other devices through the at least one set of confluence device.

10. The capacitor structure according to claim 8, wherein the capacitor structure further comprises:
    a plurality of individual housings, each individual housing wrapping one of the plurality of cells; or
    a common housing wrapping all of the parallel cell combinations, at least one set of connection ends connecting the other devices and the confluence device being provided on the common housing; or
    a plurality of combination housings wrapping each of the parallel cell combinations respectively, each of the combination housings being provided with three connection ends, and the three connection ends being connected to potentials of the other devices and adjacent parallel cell combinations.

11. A power converter, wherein the power converter comprises at least one capacitor, and the capacitor is a capacitor structure comprising a parallel cell combination,
    wherein the parallel cell combination comprises a plurality of cells and a plurality of current collectors;
    wherein in the parallel cell combination:
    the plurality of cells comprising respective first poles and respective second poles are connected in parallel, the first poles and the second poles of the plurality of cells are respectively connected in parallel, and the first poles and the second poles are respectively connected with other devices other than the parallel cell combination through confluence points; and
    the first poles and the second poles of each two adjacent cells of the plurality of cells are respectively connected through the plurality of current collectors, and current-carrying specifications of each of the plurality of current collectors is lower than current-carrying requirements of a respective confluence point of the confluence points of a corresponding pole of the first poles and the second poles.

12. The power converter according to claim 11, wherein a main circuit of the power converter is any one of the following:
    a DC-DC conversion circuit, a DC-AC conversion circuit, and an AC-AC conversion circuit.

13. The power converter according to claim 12, wherein when at least one side of the DC-DC conversion circuit is provided with a positive pole, a negative pole and a midpoint, a support capacitor on the at least one side of the DC-DC conversion circuit comprises two capacitor structures, each of the two capacitor structures is the capacitor structure; and
    the two capacitor structures are connected in series between the positive pole and the negative pole of the at least one side of the DC-DC conversion circuit, and a connection point of the two capacitor structures is connected to the midpoint of the at least one side of the DC-DC conversion circuit.

14. The power converter according to claim 12, wherein when at least one side of the DC-DC conversion circuit is provided with a positive pole, a negative pole and a midpoint, a support capacitor on the at least one side of the DC-DC conversion circuit comprises the capacitor structure;

wherein the capacitor structure further comprises another n parallel cell combinations, all of the parallel cell combinations comprising the parallel cell combination and the another n parallel cell combinations are connected in series through the confluence points, a head end and a tail end of all of the parallel cell combinations connected in series are respectively connected to a positive pole and a negative pole of the other devices through at least one set of confluence device, and a connection point of two adjacent parallel cell combinations of all of the parallel cell combinations is connected to an intermediate potential of the other devices through the at least one set of confluence device; and the capacitor structure comprises two parallel cell combinations, and each of the two parallel cell combinations is one of all of the parallel cell combinations.

15. The power converter according to claim 12, wherein a half-bus capacitor on a DC side of the DC-AC conversion circuit is the capacitor structure, two capacitor structures, each of the two capacitor structures being the capacitor structure, are connected in series between a positive pole and a negative pole of a first side of the DC-AC conversion circuit, and a connection point of the two capacitor structures is connected to a midpoint of the first side of the DC-AC conversion circuit; or a half-bus capacitor of a DC bus of the AC-AC conversion circuit is the capacitor structure, the two capacitor structures are connected in series between a positive pole and a negative pole of a first side of the AC-AC conversion circuit, and a connection point of the two capacitor structures is connected to a midpoint of the first side of the AC-AC conversion circuit.

16. The power converter according to claim 12, wherein a bus capacitor on a DC side of the DC-AC conversion circuit is the capacitor structure, and when a number of parallel cell combinations in the capacitor structure is n+1, the DC-AC conversion circuit is a n−2 level topology; or a bus capacitor of a DC bus of the AC-AC conversion circuit is the capacitor structure, and when the number of the parallel cell combinations in the capacitor structure is n+1, the DC-AC conversion circuit is a n−2 level topology;

wherein the capacitor structure further comprises another n parallel cell combinations, all of the parallel cell combinations comprising the parallel cell combination and the another n parallel cell combinations are connected in series through the confluence points, a head end and a tail end of all of the parallel cell combinations connected in series are respectively connected to a positive pole and a negative pole of the other devices through at least one set of confluence device, and a connection point of two adjacent parallel cell combinations is connected to an intermediate potential of the other devices through the at least one set of confluence device.

17. The power converter according to claim 12, wherein a filter capacitor on an AC side of the DC-AC conversion circuit is the capacitor structure; or a bus capacitor on a machine side of the AC-AC conversion circuit and/or a bus capacitor on a network side of the AC-AC conversion circuit is the capacitor structure.

* * * * *